US012795662B2

(12) United States Patent
Pradas et al.

(10) Patent No.: US 12,795,662 B2
(45) Date of Patent: Nov. 10, 2026

(54) MANAGING CONFIGURED GRANTS FOR XR APPLICATIONS

(71) Applicant: Telefonaktiebolaget LM Ericsson (publ), Stockholm (SE)

(72) Inventors: Jose Luis Pradas, Stockholm (SE); Du Ho Kang, Sollentuna (SE); Ying Sun, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 335 days.

(21) Appl. No.: 18/682,497

(22) PCT Filed: Aug. 9, 2022

(86) PCT No.: PCT/EP2022/072359
§ 371 (c)(1),
(2) Date: Feb. 9, 2024

(87) PCT Pub. No.: WO2023/017040
PCT Pub. Date: Feb. 16, 2023

(65) Prior Publication Data

US 2025/0126614 A1 Apr. 17, 2025

Related U.S. Application Data

(60) Provisional application No. 63/231,564, filed on Aug. 10, 2021.

(51) Int. Cl.
*H04W 72/1268* (2023.01)
*H04W 72/115* (2023.01)

(52) U.S. Cl.
CPC ...... *H04W 72/1268* (2013.01); *H04W 72/115* (2023.01)

(58) Field of Classification Search
CPC ........................ H04W 72/1268; H04W 72/115
See application file for complete search history.

(56) References Cited

U.S. PATENT DOCUMENTS 11,382,113 B2 * 7/2022 Liu ........................ H04W 72/52
2015/0289287 A1 10/2015 Larsson et al.
(Continued)

FOREIGN PATENT DOCUMENTS

EP 3 737 173 A1 11/2020

OTHER PUBLICATIONS

International Search Report and Written Opinion issued in International Application No. PCT/EP2022/072359 dated Nov. 23, 2022 (11 pages).
(Continued)

*Primary Examiner* — Duc C Ho
(74) *Attorney, Agent, or Firm* — Rothwell, Figg, Ernst & Manbeck, P.C.

(57) ABSTRACT

A method performed by a wireless device (UE) having a transmission buffer. The method includes the UE determining at least a first characteristic of data traffic received at the transmission buffer. The method also includes the UE, after reception of a first packet of the data traffic and before reception of a second packet of the data traffic, determining that available uplink (UL) resources are not sufficient to meet a certain latency requirement for the data traffic. The method further includes, the UE, as a result of determining that the available UL resources are not sufficient to meet the latency requirement, sending to a network node an UL resource indication message indicating that the available UL resources are not sufficient to meet the latency requirement. The UL resource indication message is not a Scheduling Request (SR) message.

20 Claims, 13 Drawing Sheets

(56) References Cited

U.S. PATENT DOCUMENTS

| | | | | |
|---|---|---|---|---|
| 2021/0409999 | A1* | 12/2021 | Chilla | H04L 45/22 |
| 2022/0150934 | A1* | 5/2022 | Freda | H04W 28/0268 |
| 2023/0397216 | A1* | 12/2023 | Kang | H04W 72/23 |

OTHER PUBLICATIONS

Ericsson, "Evaluation methodology for XR", 3GPP TSG-RAN WG1 Meeting #104-e, Tdoc R1-2101762, e-Meeting, Jan. 25-Feb. 5, 2021 (6 pages).

Qualcomm, "New SID on XR Evaluations for NR", 3GPP TSG RAN Meeting #86, RP-193241, Sitges, Spain, Dec. 9-12, 2019 (6 pages).

* cited by examiner

MANAGING CONFIGURED GRANTS FOR XR APPLICATIONS

CROSS REFERENCE TO RELATED APPLICATIONS

This application is a 35 U.S.C. § 371 National Stage of International Patent Application No. PCT/EP2022/072359, filed 2022 Aug. 9, which claims priority to U.S. Provisional Patent Application No. 63/231,564, filed on 2021 Aug. 10, which are incorporated by this reference.

TECHNICAL FIELD

The present application relates generally to the field of wireless communication networks, and more specifically to the provision of Configured Grants.

BACKGROUND 5G is the fifth generation of mobile communications, addressing a wide range of use cases from enhanced mobile broadband (eMBB) to ultra-reliable low-latency communications (URLLC) to massive machine type communications (mMTC). 5G includes the New Radio (NR) access stratum interface and the 5G Core Network (5GC). The NR physical and higher layers are reusing parts of the LTE specification, and to that add needed components when motivated by new use cases.

Low-latency high-rate applications such as extended Reality (XR) and cloud gaming are important in 5G era. XR may refer to all real-and-virtual combined environments and human-machine interactions generated by computer technology and wearables. It is an umbrella term for different types of realities including Virtual reality (VR), Augmented reality (AR), Mixed reality (MR), and the areas interpolated among them. The levels of virtuality range from partially sensory inputs to fully immersive VR.

5G NR is designed to support applications demanding high rate and low latency in line with the requirements posed by the support of XR and cloud gaming applications in NR networks. 3GPP Release 17 contains a study item on XR Evaluations for NR. The main objectives are to identify the traffic model for each application of interest, the evaluation methodology and the key performance indicators of interest for relevant deployment scenarios, and to carry out performance evaluations accordingly in order to investigate possible standardization enhancements in potential follow-up SI/WI.

The low-latency applications like XR and cloud gaming require bounded latency, not necessarily ultra-low latency. The end-to-end latency budget may be in the range of 20-80 ms, which needs to be distributed over several components including application processing latency, transport latency, radio link latency, etc. For these applications, short transmission time intervals (TTIs) or mini-slots targeting ultra-low latency may not be effective.

FIG. 1 shows an example of frame latency for 3 different users measured over a radio access network (RAN), wherein the frame latencies shown here exclude application & core network latencies. It can be seen that there exist several frame latency spikes being marked by dots. The reason for the latency spikes may include queuing delays, time-varying radio environments, time-varying frame sizes. Tools that can help to remove latency spikes are desired to enable better 5G support for this type of traffic.

Applications like XR and cloud gaming require bounded latency requirements as well as a high transmission data rate. This can be seen from the large frame sizes originating from this type of traffic. The typical frame sizes may range from tens of kilobytes to hundreds of kilobytes. The frame arrival rates may be 60 or 120 frames per second (fps). As a concrete example, a frame size of 100 kilobytes and a frame arrival rate of 120 fps can lead to a rate requirement of 95.8 Mbps.

A large video frame is usually fragmented into smaller IP packets and transmitted as several transport blocks (TBs) over several TTIs in RAN. FIG. 2 shows an example of the cumulative distribution functions of the number of transport blocks required to deliver a video frame with size ranging from 20 KB to 300 KB. For example, FIG. 2 shows that for delivering the frames with a size of 200 KB each, the median number of needed TBs is 5.

The characteristics of XR traffic arrival are quite distinct from typical web-browsing and Voice-over-IP, VoIP traffic as exemplarily shown in FIG. 3. It is well expected that the arrival time is quasi-periodic and largely predictable similar to VoIP. However, its data size is order of magnitude larger than for VoIP, as discussed above. Similar to web-browsing, the data size is expected to be different at every application PDU arrival instance due to dynamics of contents and/or human interactivity with respect to the application.

In uplink, the device may transmit to the network so-called pose information which may contain information (coordinates) of head or device positions. Pose messages are periodic, rather frequent (e.g. every 4 ms), and they have a small size (e.g. a couple of hundreds of bytes). In that sense, pose messages may be regarded to be similar to Voice-over-IP, VoIP, traffic or to Industrial Internet of Things, IIoT, traffic.

Uplink resource allocation for uplink transmission with configured grant and downlink resource allocation for downlink transmission with SPS:

In cellular wireless systems, such as Long Term Evolution (LTE) or New Radio (NR) standards in 3GPP, resources for uplink/downlink (UL/DL) transmissions are configured and scheduled by the network node (eNB or gNB). This can be done dynamically, such that network node schedules the transmission per transmission occasion which can be one or a plurality of transmission time intervals (TTIs).

Besides dynamic scheduling, DL transmission can configured be higher layer using the semi persistent scheduling (SPS) framework, in which multiple periodic resources are granted at the same time prior to data transmission. Configuration of SPS may include periodicity of the grant, resource allocation in time and frequency and modulation and coding scheme (MCS) in SPS occasions.

Similarly, allocating periodic UL transmission resources is also supported. Such mechanism is also being referred to as “configured grant”, “UL transmission without grant”, or “grant-free transmission”. In the following, the term “configured grant”, CGT will be used for all such kind of resource allocation. Two types of UL transmission with configured grant have been specified. In type 1 UL transmission with configured grant, resource allocation is only based on RRC (re) configuration while L1 signalling is only used to activate/deactivate the configuration (similar to DL SPS). In type 2 UL transmission with configured grant, resource allocation is partly determined by RRC (re) configuration and partly determined by L1 signalling used for activating/deactivating the configuration.

In NR networks, TDD (Time Division Duplexing) is a common transmission method. In TDD, downlink and uplink transmissions happen at different times. When there is a downlink transmission, there cannot be an uplink transmission and vice versa. TDD patterns defined the downlink and uplink slots in the timeline and TDD patterns are, therefore, periodic. By way of example, a TDD pattern may be "DDDU" with 3 consecutive slots in the downlink (D) and one slot in the UL (U). TDD patterns are defined and indicated by the network.

When the network wants to use TDD and UL configured grants, the network determines a suitable TDD pattern and UL configured grant configuration so that the UL slots in the TDD pattern match the UL configured grant configuration.

When XR traffic is added to this scheme, things get more complex. Concretely, when UL pose traffic is considered as a candidate to be carried in an UL configured grant, issues may result from that fact that TDD patterns may not be aligned with the periodicity of the pose traffic.

When a certain traffic packet arrives, the closest or next UL slot may not comprise any configured grant so that it can only be transmitted in the next following UL slot comprising a configured grant. Thus, the traffic delay may exceed an allowed latency requirement or threshold.

FIG. 4 exemplarily shows a TDD transmission/reception scheme with a DDDDU pattern, i.e., there are 4 consecutive downlink, DL, slots followed by one uplink, UL, slot. By way of example, FIG. 4 shows 8 consecutive patterns with each four DL slots and one UL slot; exemplarity, the first pattern shows consecutive DL slots 11, 12, 13, 14 followed by UL slot 15. The first repetition of the pattern shows consecutive DL slots 21, 12, 13, 14 followed by UL slot 25, and so forth.

By further way of example, every second UL slot, i.e., UL slots 15, 35, 55 and 75 comprise each a Configured Grant being configured and available (being denoted as U GC), UL slots 25, 45, 65 and 85 in between those slots do not comprise any configured grant (being denoted as U).

By way of example, slot length is 0.5 millisecond (ms), so that the there is a repetition of the DDDDU pattern every 2.5 ms.

This pattern in principle allows for a transmission every 2.5 ms, if there is an activated configured grant and/or a dynamic grant in the respective UL slot. However, configured grants may not be activated in every UL slot. By way of example, only every second UL slot comprises an activated UL configured grant.

Thereto, FIG. 5*a* shows an example, where first traffic comprises a first sequence of a packets P101, P102, P103, P104 arriving every 4 ms, i.e., every 8 slots, at a transmission buffer of the UE. The transmission pattern of the UE by way of example is under the regime of the DDDDU pattern as shown in FIG. 4. First packet (of the first sequence) P101 arrives at DL slot 14 and is being transmitted at UL slot 15 (i.e. in the next slot). Second packet P102 arrives at DL slot 32 and is being transmitted at UL slot 35 (i.e., in the fourth slot after arrival at the buffer). Third packet P103 arrives at non-activated UL slot 45 and is being transmitted at UL slot 55 (i.e., in the fifth slot after arrival). Fourth packet P104 arrives at DL slot 63 and is being transmitted at UL slot 75 (i.e., in the seventh slot after arrival).

FIG. 5*b* shows another example with the same pattern and a second sequence of packets. First packet (of the second sequence) P201 arrives at DL slot 11 and is being transmitted at UL slot 15 (i.e. in the fourth slot after arrival at the buffer). Second packet P201 arrives at DL slot 24 and is being transmitted at UL slot 35 (i.e., in the sixth slot after arrival at the buffer). Third packet P301 arrives at DL slot 42 and is being transmitted at UL slot 55 (i.e., in the nineth slot after arrival).

As apparent, the periodicity of the activated configured grant UL slots is not aligned with the traffic periodicity. That has the effect that, the waiting time of the different packets within the buffer is different from packet to packet. Some of the packets arrive to the buffer, where there is no close configured grant UL slot to transmit the data. In examples shown here, the transmission of the data may be delayed beyond 4 ms and up to 5 ms (e.g., third packet P203 of the second sequence). If we assume that the pose traffic requires a latency of maximum 4 ms, such scheme would not meet such latency requirement.

One solution to solve the latency issue could be to use the Scheduling Request (SR) so that eventually the UE would receive a dynamic grant (baseline solution). However, also this solution may not solve the latency problem as the dynamic grant to transmit in the UL may not arrive before the next UL slot containing a configured grant.

In addition, part of the dynamic grant would carry the Buffer Status Report, BSR, if this was triggered, which may also result in that the transmission of the UL user data will be delayed even further to a later UL slot. Thus, the baseline solution may be as well insufficient to solve the latency problem.

SUMMARY

Solutions provided in the applications result from an insight that the UE may indicate to the network in advance if available UL resources are (not) sufficient to transmit certain traffic, e.g., pose traffic associated to an XR application according to certain latency requirement of the XR application.

In an embodiment, a wireless device or UE comprising a transmission buffer being configured according to a certain time division duplex (TDD) pattern is provided that performs the steps of:

- determining characteristics of data traffic received at the transmission buffer,
- at reception of a first packet of the data traffic, determining that available uplink, UL, resources are not sufficient to transmit a second packet of the data traffic early enough to meet a certain latency requirement, and
- sending a corresponding indication to a network node.

Thereto, the UE may determine, if at an expected arrival time of a new data packet into the buffer, there are allocated (activated) UL resources in a certain time interval that are sufficient to transmit the data packet. In the negative, the UE may indicate to the network that there is not sufficient UL resources available for the traffic. The indication may be indicative of which non-activated configured grants can be activated to perform the transmission of that expected data. Alternatively or additionally, the UE may also indicate that certain configured grants are not used.

In an embodiment, a UE is provided that comprises:

- radio interface circuitry configured to communicate with a network node via at least one cell; and
- processing circuitry operably coupled to the radio interface circuitry;
- whereby the processing circuitry and the radio interface circuitry are configured to perform the method described above.

In an embodiment, a network node is provided that performs the steps of:

receiving from a UE data traffic comprising a plurality of packets associated to a certain data traffic;

receiving an indication that available uplink, UL, resources at the UE are not sufficient to receive a second packet of the data traffic early enough to meet a certain latency requirement, and transmitting control information indicative of an activation of UL resources to be used for a transmission of the second packet.

In an embodiment, a network node is provided that comprises:

interface circuitry configured to communicate with a UE;

processing circuitry operably coupled to the interface circuitry;

whereby the processing circuitry and the interface circuitry being configured to perform the method described above.

These embodiments allow the UE to indicate to the network early enough when the UE will need an UL resource. Doing so, the network may be able to provide a dynamic grant or activate an UL configured grant. Thus, the data might not be delayed beyond a certain time threshold, so that the latency requirement is met.

The network may provide sufficient UL resources, e.g. activate UL configured grants or updated activated UL configured grants so the UE may transmit the traffic according to the certain latency requirement.

These and other objects, features and advantages of the present disclosure will become apparent upon reading the following Detailed Description in view of the Drawings briefly described below.

DETAILED DESCRIPTION

Figure 1:
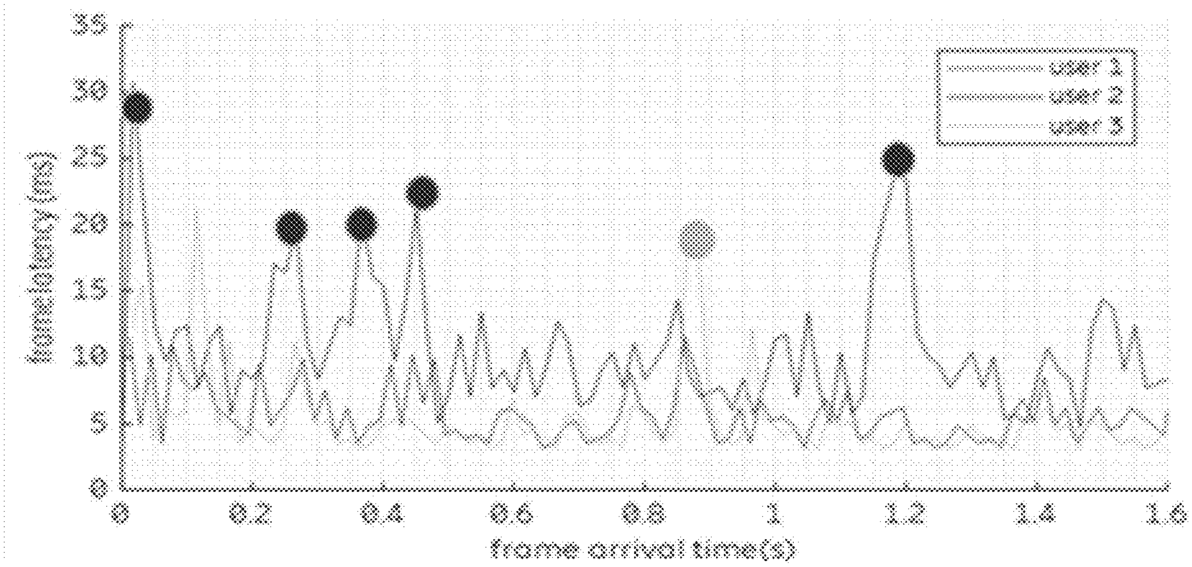
Figure 1 (Prior Art)
FIG. 1 shows an example of frame latency measured over a radio access network.
Figure 2:
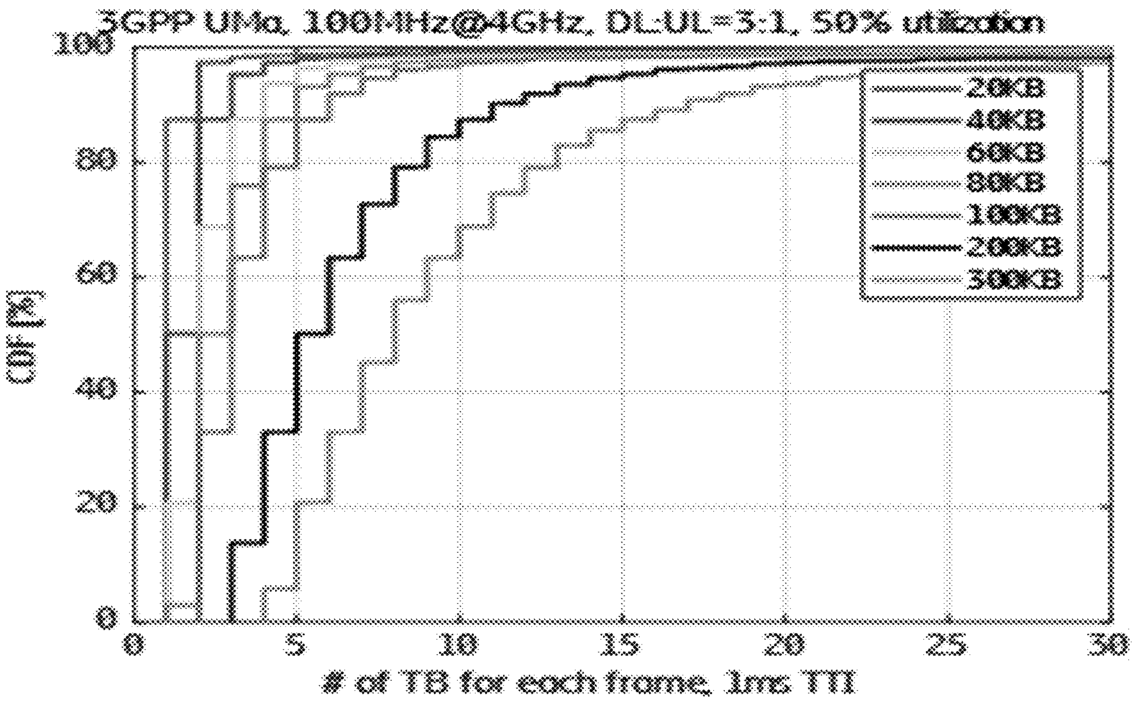
Figure 2 (Prior Art)
FIG. 2 depicts an example of the cumulative distribution functions of the number of transport blocks required to deliver a video frame.
Figure 3:
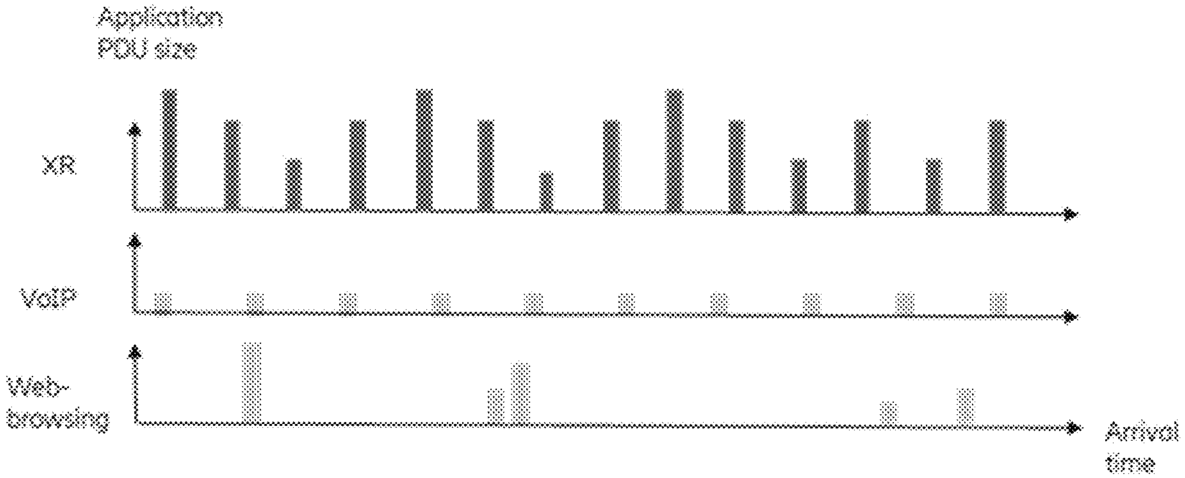
Figure 3 (Prior Art)
FIG. 3 depicts XR traffic characteristics compared to VoIP and Web-browsing.

Some of the embodiments contemplated herein will now be described more fully with reference to the accompanying drawings. The following terms are used throughout the description given below:

Wireless Device, UE: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using radio waves, and/or other types of signals suitable for conveying information through air.

Network Node: As used herein, the network node" can be any node in the network e.g. a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, a relay node, and a non-terrestrial access node (e.g., satellite or gateway).

It may be noted that the description given herein focuses on a 3GPP cellular communications system and, accordingly, 3GPP terminology or terminology similar to 3GPP terminology is used throughout this document. However, the present invention may as well be implemented in communication technologies like Wide Band Code Division Multiple Access (WCDMA), Worldwide Interoperability for Microwave Access (WiMax), Ultra Mobile Broadband (UMB).

In addition, functions and/or operations described herein as being performed by a wireless device, a RAN node may be distributed over a plurality of wireless devices and/or network nodes.

In XR, great part of the traffic may be periodic with varying large packet size such as e.g., used in video traffic.

However, in the UL, there may be other type of traffic such as pose or other control application traffic. Pose data is, for example, periodic and its size confined to a couple of hundreds of bytes.

Typically, TDD patterns are being configured in the network in a way that maximizes the network throughput. Consequently, such configuration may not take into account individual needs of each UE, e.g., timing/latency requirements of individual traffic of certain UEs. If there is periodic traffic with strict latency requirements, a non-alignment of the TDD pattern with the periodicity of the traffic for a UE can be detrimental to applications that are associated to the periodic traffic.

For periodic data traffic with small packet sizes, configured grants (either downlink or uplink) may be a suitable mechanism to schedule said traffic. Configured grants reduce the signaling load in the network. Thereto, the network may configure a UE, a specific DRB or LCID, having periodic traffic, such as afore-discussed pose traffic, with one or more UL configured grant configurations. An UL configured grant configuration may be activated or deactivated.

Figure 4:
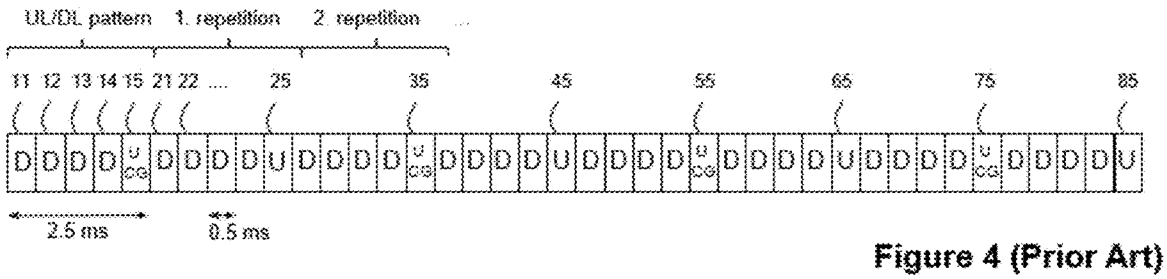
Figure 4 (Prior Art)
FIG. 4 shows an exemplary TDD reception/transmission pattern scheme with UL configured grants.

As shown in FIG. 4, UL packets of periodic traffic such as pose traffic discussed above occasionally arrive to the buffer at times when there is an UL slot, but wherein no UL configured grants configured or activated. As discussed above, such situation my violate timing/latency requirements associated to that traffic.

In order to mitigate such problems introduced by the lack of UL configured grants, embodiments described in the following provide a mechanism wherein the UE may indicate to the network a need of resources in a certain UL slot.

Figure 7:
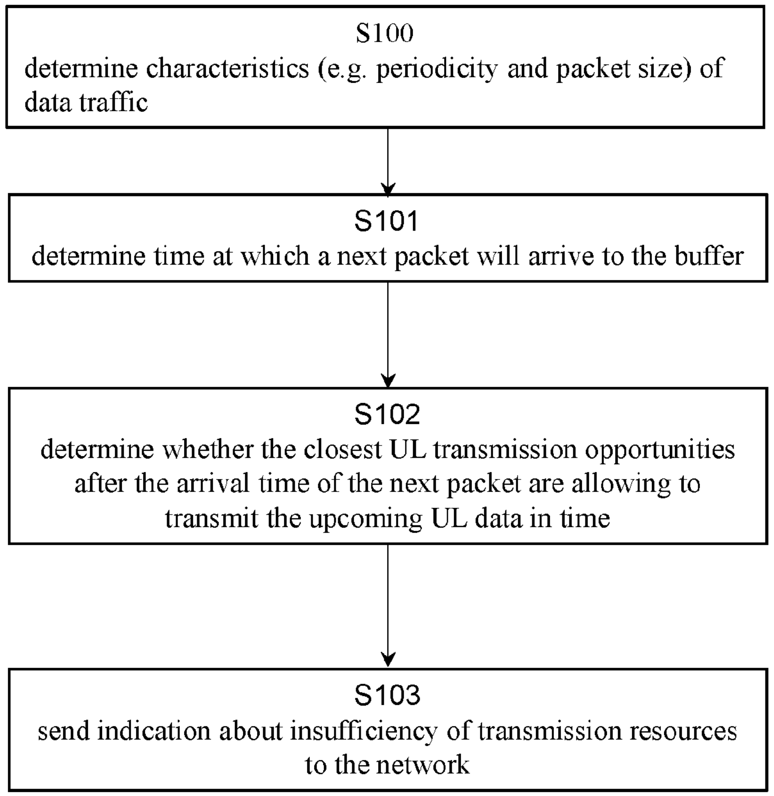
FIG. 7 is first flow chart of exemplary steps performed in a UE.

In an example depicted in FIG. 7, the UE is involved in the traffic with the timing/latency requirement. Therein, the UE is receiving data traffic at a transmission buffer, wherein the transmission buffer is being configured according to a certain time division duplex, TDD, pattern as e.g. explained FIGS. 5*a* and 5*b*.

In step S100, the UE determine characteristics of the traffic, e.g., a periodicity of the traffic and/or packet size.

In step S101, (at reception of a first packet of the data traffic) the UE determines a time at which a second packet will arrive to the buffer.

In step S102, the UE determines that available uplink, UL, resources are not sufficient to transmit a second packet of the data traffic early enough to meet a certain latency requirement.

For this purpose, the UE may determine whether the nearest (or closest) UL transmission opportunities (e.g., UL slot(s), UL symbols) after the arrival of the second packet comprises one or more UL transmission opportunities to transmit the upcoming UL data, wherein the UL transmission opportunity may comprise an activated UL configured grant that sufficient to transmit the second packet.

The UE may further determine that there is no transmission opportunity that is sufficient to transmit the second packet (e.g., if there are configured UL configured grants available, but not activated, or if there are one or more activated configured UL grants, but the one or more activated UL configured UL grants is/are not sufficient with respect to the size of the packet).

In step S103, the UE sends an information about insufficiency of transmission resources to to the network (e.g. in a first UL transmission opportunity indicative of such determining).

The information may comprise one or more of the following:
- that the activated UL configured grants are not sufficient to transmit the second packet,
- a difference between an allocated grant (activated UL configured grants) and the size of the second packet,
- information about a presence of one or more non-activated UL configured grants,
- an expected packet size of the second packet, and
- timing information (e.g., a frame/slot number) indicating about when a UL configured grant is needed.

Figure 8:
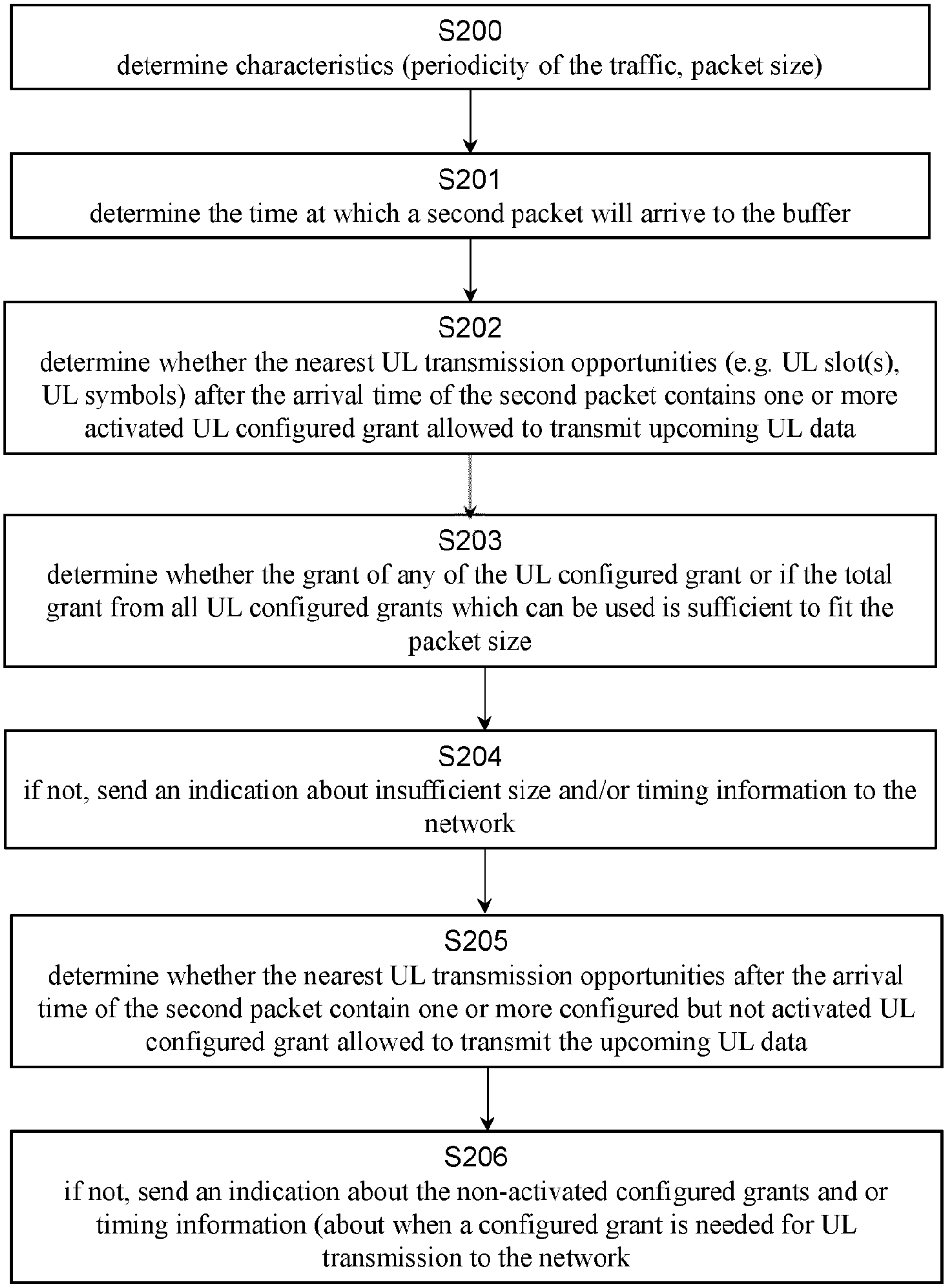
FIG. 8 is a second flow chart of exemplary steps performed in the UE

In an embodiment thereto, the UE performs the following steps as shown in FIG. 8; therein steps S200-S202 are similar to steps 100-D102 of FIG. 7.

In step S200, the UE determines characteristics (periodicity of the traffic, packet size).

In step S201, the UE determines the time at which a second packet will arrive to the buffer.

In step S202, the UE determines whether the nearest UL transmission opportunities (e.g. UL slot(s), UL symbols) after the arrival time of the second packet contains one or more activated UL configured grant allowed to transmit upcoming UL data.

In step S203, the UE determines whether the grant of any of the UL configured grant or if the total grant from all UL configured grants which can be used is sufficient to fit the packet size.

In step 204, in the negative, the UE sends an indication about insufficient size and/or timing information to the network.

In step S205 the UE determines whether the nearest UL transmission opportunities after the arrival time of the second packet contain one or more configured but not activated UL configured grant allowed to transmit the upcoming UL data.

In step S206, in the negative, the UE sends an indication about the non-activated configured grants and or timing information (about when a configured grant is needed for UL transmission) to the network.

Steps S202-S204 and steps S205-S206 can be performed either sequence. Steps S202-204 or steps S205-206 may be omitted.

In the following, a more detailed embodiment is described:

1) The UE determines the periodicity of the traffic and, possibly, the packet size.
2) The UE determines the time at which a second packet will arrive to the buffer.
3) The UE determines whether the nearest UL transmission opportunities (e.g. UL slot(s), UL symbols) after the arrival time of the second packet:
   a. contains one or more activated UL configured grant allowed to transmit the upcoming UL data,
   b. contains one or more configured but not activated UL configured grant allowed to transmit the upcoming UL data,
4) If 3*a*. is true:
   a. The UE determines whether the grant of any of the UL configured grant or if the total grant from all UL configured grants which can be used is sufficient to fit the packet size determined in 1)
   b. If 4*a* returns that it is not sufficient:
      i. The UE indicates to the network in a first UL transmission one or more of the following:
         1. that the activated UL configured grants are not sufficient to transmit the second packet,
         2. the expected packet size,
         3. the difference between the allocated grant and the second packet size, 4. Timing information (e.g. by way of indicating a frame/slot number) indicating when the UL configured grant is needed.

5) If 3*b*. is true:
   i. The UE indicates to the network in a first UL transmission one or more of the following:
      1. one or a plurality of UL configured grants determined in 3*b*,
      2. the expected packet size,
      3. Timing information (e.g. by way of indicating a frame/slot number) indicating when the UL configured grant is needed.
   b. The UE may provide a prioritized list based on different aspects such as the priority of the configured grant, or whether a specific UL configured can completely transmit the second packet.

6) If both 4*b*. and 5. are executed, the UE may indicate one or more of the information elements of both sections.

7) If 3*a*. and 3*b*. resulted in that no configured UL grant is available in the nearest UL transmission opportunities:
   a. The UE indicates to the network in a first UL transmission one or more of the following:
      i. resources are needed,
      ii. timing information (e.g. frame number, slot number) which will indicate when the grant is needed,
      iii. the expected packet size for transmission.

The indications outlined above could be transmitted in a first UL transmissions in a MAC Control Element as explained below.

In an Embodiment a RAN centric scheme for the reuse of unused configured grants is being described:

A UL packet occasionally arrives to the buffer at a times when the number of activated configured grants is more than required resource before the next UL packet arrival. In this case, some of activated configured grants will not be used before the next UL packet arrival. In order to maximize UL resource to other users, a UE can also indicate to the network 'no need' of activated configured grants.

This can be done with the following steps similarly as described above:

1) The UE determines the periodicity of the traffic and, possibly, the packet size.
2) The UE determines the time at which a second packet will arrive to the buffer.
3) The UE determines whether any of activated UL configured grants will not be used before the arrival time of the second packet
4) If UE will find any unused activated UL configured grants, the UE determines which activated configured grants will not be used and indicates to the network UL configured grants which may be reused by other users.
   a. The UE indication may include the timing related information of resource unused activated configured grants, e.g., UL symbol or slot index or a time range that configured grants are not needed.
   b. The indications could be transmitted in a first UL transmissions in a MAC Control Element as explained below.

A device chipset and application layer coordination in the UE may be performed comprising the following steps:

1) The UE determines the periodicity of the traffic and, possibly, the packet size.
2) The UE determines the time at which a second packet arrives to the buffer.
3) The UE determines the time offset (i.e. the time difference) to the closest UL CG that potentially the predicted 2nd packet can be transmitted so that the latency requirement is expected to be met.
4) The UE sends an indication to the application layer about the time offset.
5) The Application layer adjusts the 2nd packet generation based on the time offset that obtained from the indication.

Figure 9:
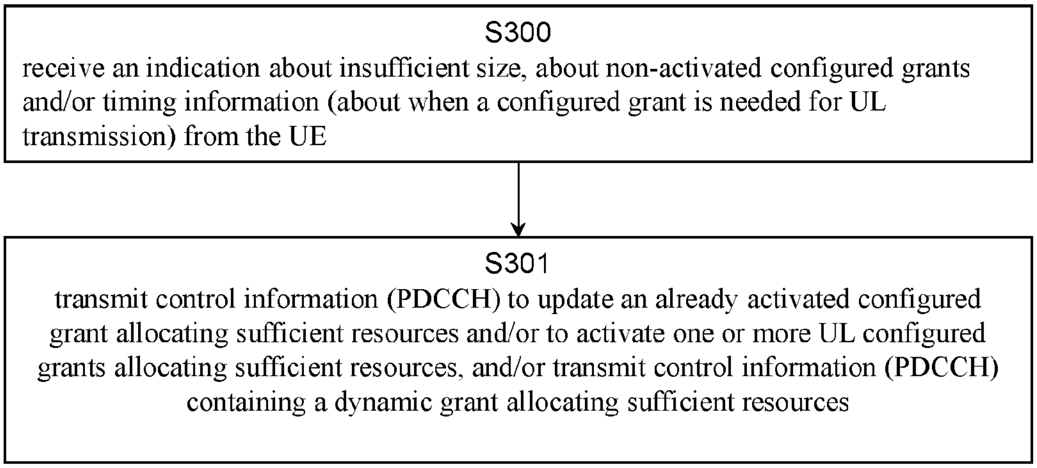
FIG. 9 is a flow chart of exemplary steps performed in a network node.

Network Methods:

FIG. 9 shows a network node receiving from a UE data traffic comprising a plurality of packets associated to the data traffic as described above.

In step S300, the network receives an indication that available uplink, UL, resources at the UE are not sufficient to receive a second packet of the data traffic early enough to meet a certain latency requirement.

In step S301, the network node transmits control information indicative of an activation of UL resources to be used for a transmission of the second packet.

The indication may comprise at least one of: one or a plurality of UL configured grants, UL CGs, for the UE, an (expected) size of the second packet, and timing information, indicating at which time a UL configured grant is needed, e.g. a frame and a/or a slot number of the configured uplink grant to be activated.

The indication may comprise at least one of: an indication that activated UL configured grants are not sufficient to transmit the second packet, the expected packet size, a difference in size between the activated UL configured grant and the second packet size and timing information (e.g. frame/slot number) indicating at which time a UL configured grant is needed.

In the following, a more detailed embodiment is described:

1) If the NW receives the indication transmitted in step 4) described above:
   a. The NW may transmit a PDCCH to update the already activated configured grant allocating sufficient resources so that the UE can transmit the indicated packet size.
   b. Alternatively, the NW may transmit a PDCCH activate another UL configured grant with higher priority than the first activated UL configured grant so that the UE can transmit the indicated packet size.
      i. In addition, the PDCCH may deactivate the first activated UL configured grant. In this case, the second activated UL configured grant does not have to have a higher priority than the first UL configured grant.
   c. Alternatively, the NW may transmit a PDCCH containing a dynamic grant so that the UE can transmit the indicated packet size. The UE would then use the grant with highest priority i.e. the dynamic grant. The priority of this dynamic grant may be higher than the configured grant.
2) If the NW receives the indication transmitted in Step 5) described above:
   a. The NW may transmit a PDCCH to activate one or more UL configured grants from the set indicated by the UE allocating sufficient resources so that the UE can transmit the indicated packet size.
   b. Alternatively, the NW may transmit a PDCCH to activate one or more UL configured grants different from the set indicated by the UE allocating sufficient resources so that the UE can transmit the indicated packet size.

c. Alternatively, the NW may transmit a PDCCH to activate one or more UL configured grants allocating sufficient resources so that the UE can transmit the indicated packet size. These UL configured grants may be from the set indicated by the UE or different from the one(s) indicated by the UE d. Alternatively, the NW may transmit a PDCCH containing a dynamic grant allocating sufficient resources so that the UE can transmit the indicated packet size.

3) If the NW receives the indication transmitted in 7) described above:

a. The NW may transmit a PDCCH containing a dynamic grant so that the UE can transmit the indicated packet size.

4) If the NW receives the indication transmitted in step 4) described above:

a. The network may reallocate the indicated unused configured grant resource to other users.

b. In addition, the network may further deactivate the indicated configurated grant if the indicated configured grant(s) are expected to not be used for a certain period of time.

A MAC (Medium Access Control) CE (Control Element), may be used mechanism to signal to the network the indication e.g. the UL configured grant or grants. The MAC CE may be part of a MAC Protocol Data Unit, PDU.

The MAC CE may contain one or more of the following:

a. An index or a list of indices pointing at configured UL configured grant(s); such list of indices may comprise:

i. an index indicating that no UL configured grant is available but a new grant is needed; and/or ii. an index indicating that unused UL configured grant is available for reuse;

b. The data size of the packet to be transmitted;

c. The total buffer status to be transmitted;

d. The difference between the packet size and the available grant (when the current activated grants are not sufficient); and e. Timing information such as, for instance, the frame number and/or UL slot index in which the resources are needed or which resource may be reused.

In the following an example is depicted, in which the latency problems shown in FIGS. 5*a* and 5*b* can be improved in accordance to the principles described above.

Figure 5A:
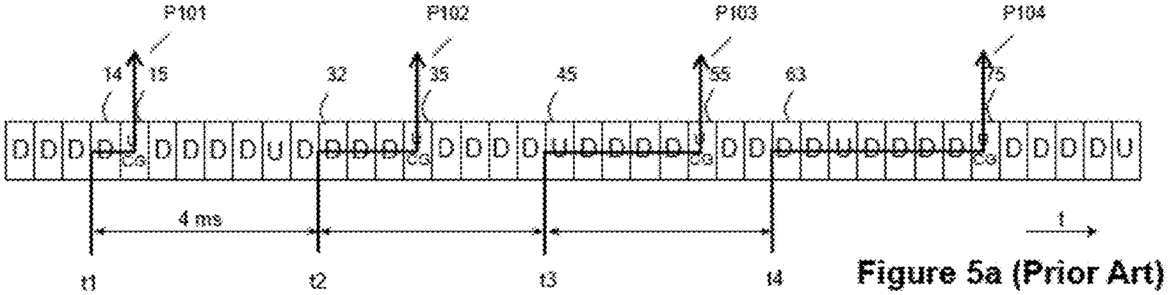
Figure 5a (Prior Art)
FIG. 5*a* shows a treatment of a first sequence of packets arriving at a buffer of a UE being controlled according to the TDD schema of FIG. 4, according to the prior art.
Figure 6A:
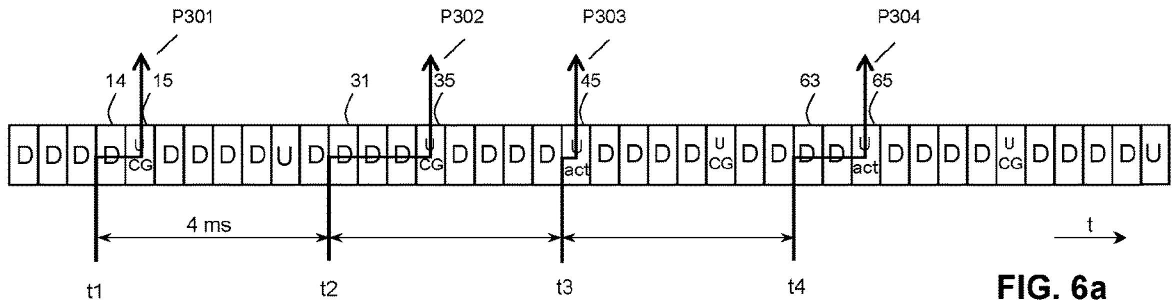
FIG. 6*a* shows a treatment of a first sequence of packets arriving at a buffer of a UE being controlled according to the TDD schema of FIG. 4, according to the invention.

FIG. 6*a* is similar to FIG. 5*a*, with the difference that corresponding packets P301-P304 are now partly transmitted earlier so that packet latency is reduced. Thereto, the UE initiates activating UL configured grants in slots 45 and 65 so that packets P303 and P304 can now be each at the earlies possible time (i.e. both packets are transmitted 2.5 ms earlier).

Figure 5B:
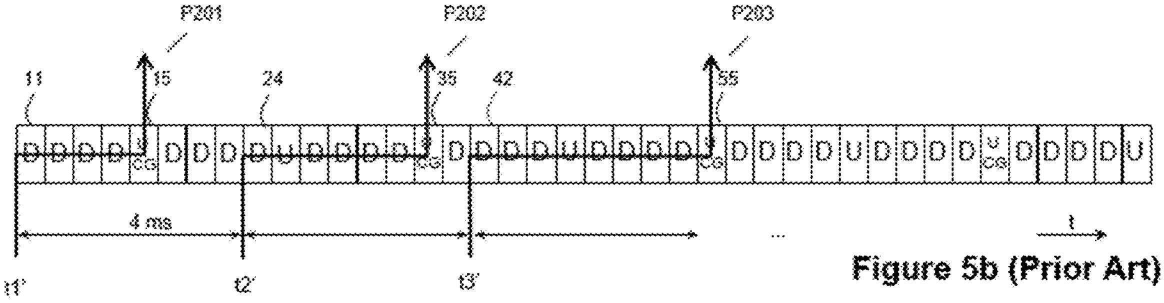
Figure 5b (Prior Art)
FIG. 5*b* shows treatment of a second sequence of packets arriving at the buffer being controlled according to the TDD schema of FIG. 4 according to the prior art.
Figure 6B:
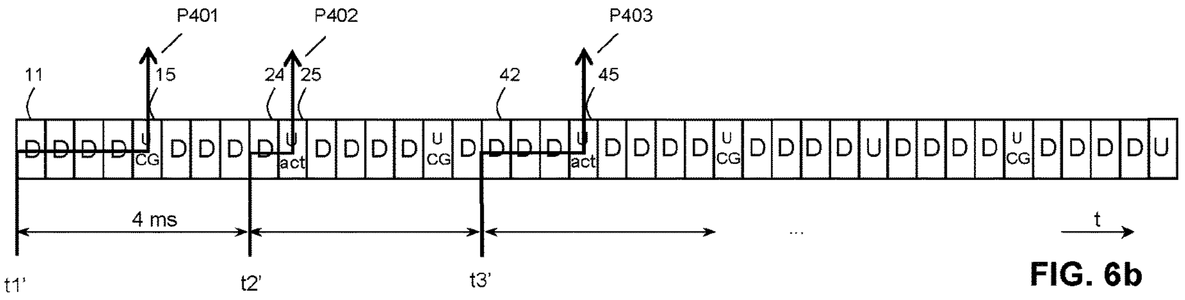
FIG. 6*b* shows treatment of a second sequence of packets arriving at the buffer being controlled according to the TDD schema of FIG. 4 according to invention.

FIG. 6*b* is similar to FIG. 5*b*, with the difference that corresponding packets P401-P403 are now partly transmitted earlier so that packet latency is reduced. Thereto, the UE initiates activating UL configured grants in slots 25 and 45 so that packets P402 and P403 can now be each at the earlies possible time (i.e. both packets are also transmitted 2.5 ms earlier). Especially packet P203 of FIG. 5*a* exceeding the latency threshold of 4 ms can now be transmitted (as packet P403) in time.

In the description above, it has been assumed that the packets arrive at a strict frequency (e.g. every 4 ms). However, it is well possible that there is some variation (jitter) e.g. due to a communication over multiple layers. So, according to the prior art, there may be even an increased danger to exceed a given latency threshold. The invention allows to take such variation into account (e.g. when determining an expected (a worst case arrival time) and to take care that sufficient UL resources are activated in advance.

Figure 10:
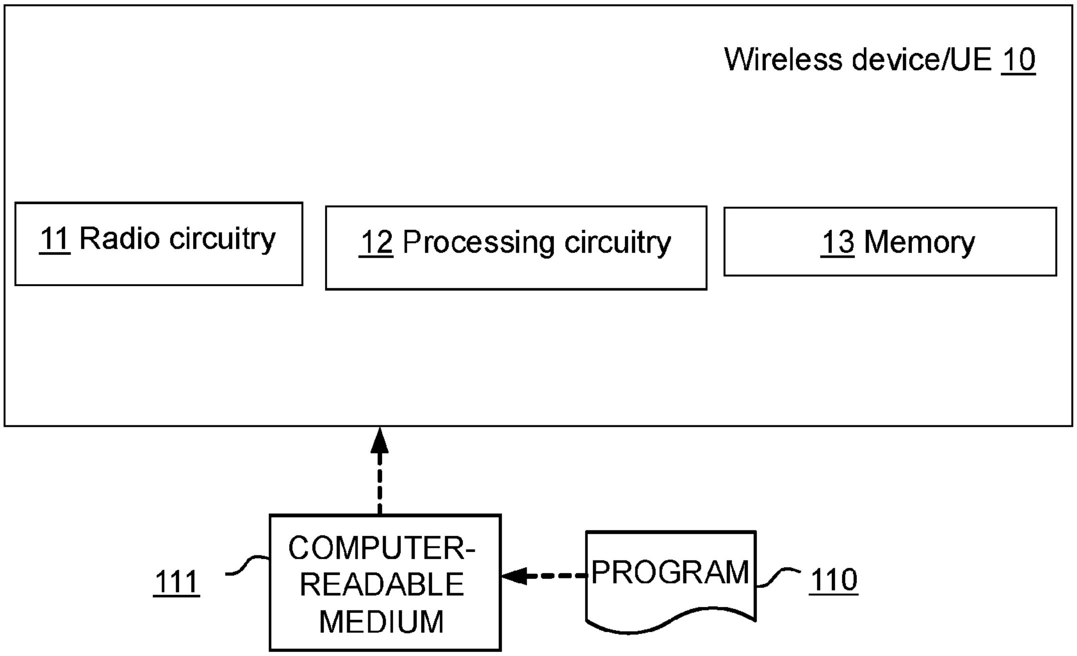
FIG. 10 is a first exemplary block diagram of a UE.

As illustrated in FIG. 10, a wireless device, WD, or user equipment, UE, 10 includes an antenna processing circuitry or radio circuitry 11, device-readable medium 11, processing circuitry 12 and memory 13. The UE further may comprise a user power source and power circuitry. UE can include multiple sets of one or more of the illustrated components for different wireless technologies supported by WD, such as, for example, GSM, WCDMA, LTE, NR, WiFi, WiMAX, or Bluetooth wireless technologies, just to mention a few. These wireless technologies can be integrated into the same or different chips or set of chips as other components within UE 10.

The UE further comprises an Antenna that can include one or more antenna arrays, configured to send and/or receive wireless signals. In certain alternative embodiments, the antenna can be separate from UE 10 and be connectable to UE 10 through an interface or port.

Processing circuitry 12 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other UE 10 components, such as device-readable medium 11, UE 10 functionality. Such functionality can include providing any of the various wireless features or benefits discussed herein. For example, processing circuitry 12 can execute instructions stored in device-readable medium 111 or in memory 110 within processing circuitry 12 to provide the functionality disclosed herein.

Processing circuitry 12 can be configured to perform any determining, calculating, or similar operations (e.g., certain obtaining operations) described herein as being performed by a UE. These operations, as performed by processing circuitry 12, can include processing information obtained by processing circuitry 12 by, for example, converting the obtained information into other information, comparing the obtained information or converted information to information stored by UE 10, and/or performing one or more operations based on the obtained information or converted information, and as a result of said processing making a determination.

Figure 11:
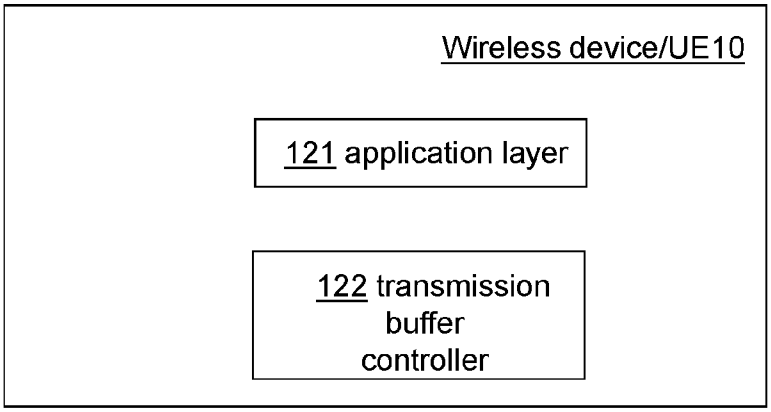
FIG. 11 is a second exemplary block diagram of the UE.

FIG. 11 shows another block diagram of UE 10 comprising an application layer 121 a control layer 122, the control layer comprising a transmission buffer controller to control the transmission buffer as described above.

Figure 12:
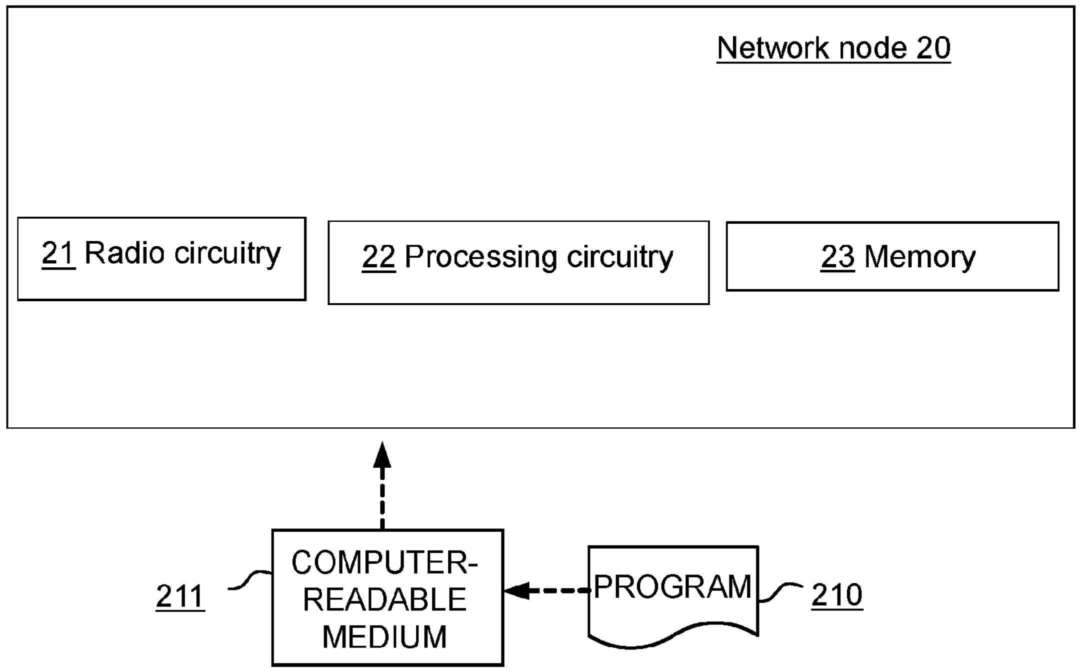
FIG. 12 is an exemplary block diagram of a network node.

FIG. 12 shows a block diagram of an exemplary network node 20, that may also be referred or comprise a base station to various embodiments of the present disclosure, including those described above with reference to other figures. For example, exemplary network node 20 can be configured by execution of instructions, stored on a computer-readable medium, to perform operations corresponding to one or more of the exemplary methods described herein.

Network node 20 can include processor 22 (also referred to as "processing circuitry") that is operably connected to program memory 211 and data memory 210 via a data bus, which can include parallel address and data buses, serial ports, or other methods and/or structures known to those of ordinary skill in the art.

Program memory 211 can store software code, programs, and/or instructions that, when executed by processor 22, can configure and/or facilitate network node 20 to perform various operations, including operations corresponding to various exemplary methods described herein. As part of and/or in addition to such operations, program memory 211 can also include software code executed by processor 22 that can configure and/or facilitate network node 20 to communicate with one or more other UEs or other network nodes node using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio circuitry 21 and/or core network interface 1050. Data memory 203 can comprise memory area for processor 202 to store variables used in protocols, configuration, control, and other functions of RAN node 200. As such, program memory 211 and data memory 23 can comprise non-volatile memory (e.g., flash memory, hard disk, etc.), volatile memory (e.g., static or dynamic RAM), network-based (e.g., "cloud") storage, or a combination thereof. Processor 22 can include multiple individual processors (not shown), each of which implements a portion of the functionality described above.

Figure 13:
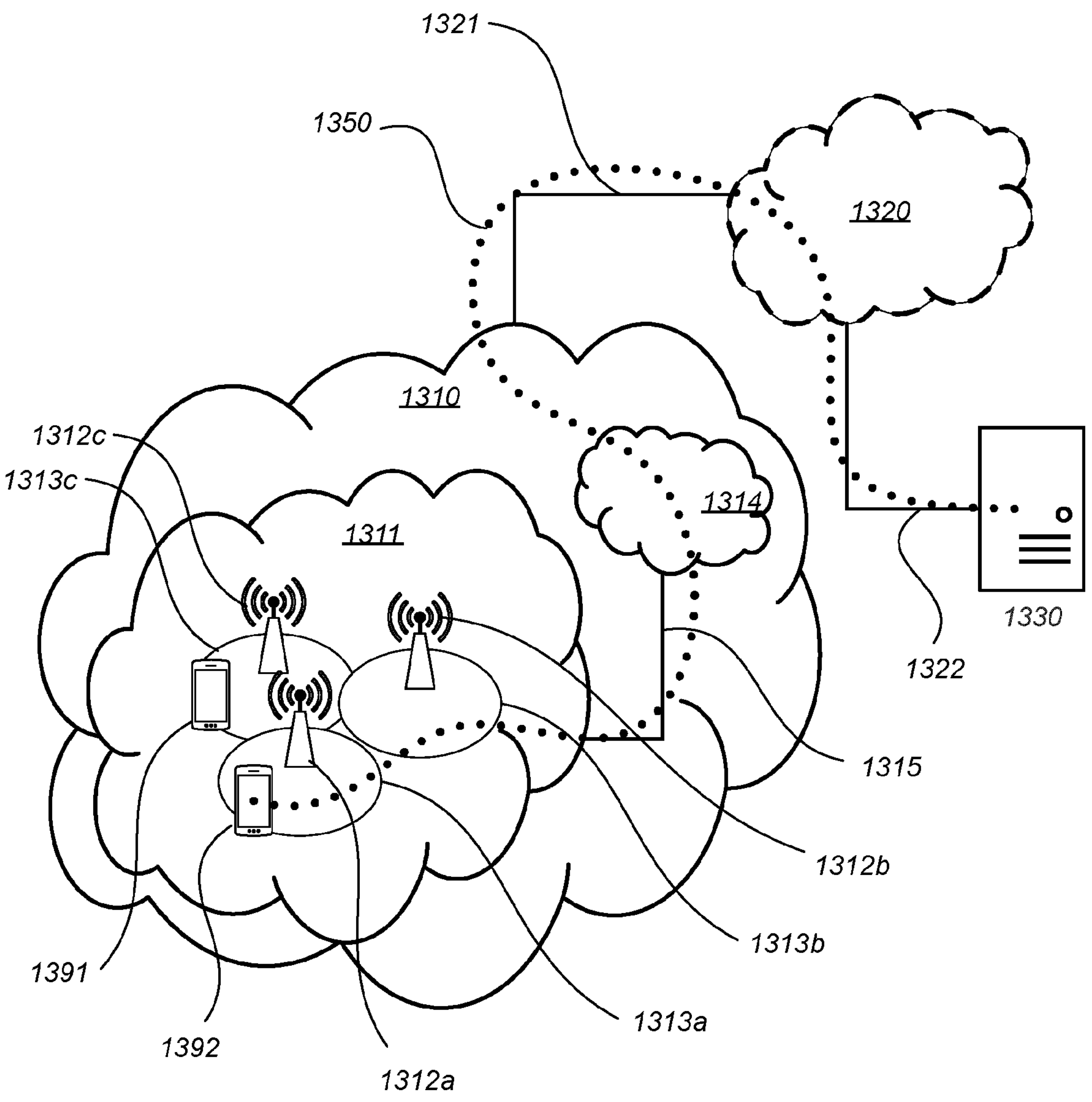
FIG. 13 is a schematic block diagram illustrating a telecommunication network connected via an intermediate network to a host computer.

With reference to FIG. 13, in accordance with an embodiment, a communication system includes telecommunication network 1310 such as the wireless communications network 100, for example, a 3GPP-type cellular network, which comprises access network 1311, such as a radio access network, and core network 1314. Access network 1311 comprises a plurality of network nodes such as any, or both, of the first node 111 and the second node 112. For example, base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A plurality of user equipments, such as the user equipment 130 may be comprised in the wireless communications network 100. In FIG. 13, a first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312. Any of the UEs 1391, 1392 may be considered examples of the user equipment 130.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

In relation to FIGS. 14, 15, 16, 17, and 18, which are described next, it may be understood that a UE is an example of the user equipment 130, and that any description provided for the UE equally applies to the user equipment 130. It may be also understood that the base station may be considered an example of any, or both, of the first node 111 and the second node 112, and that any description provided for the base station equally applies to any, or both, of the first node 111 and the second node 112.

Example implementations, of the user equipment 130, e.g., a UE, and any, or both, of the first node 111 and the second node 112, e.g., a base station and host computer discussed in the preceding paragraphs will now be described with reference to FIG. 14. In communication system 1400, such as the wireless communications network 100, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Figure 14:
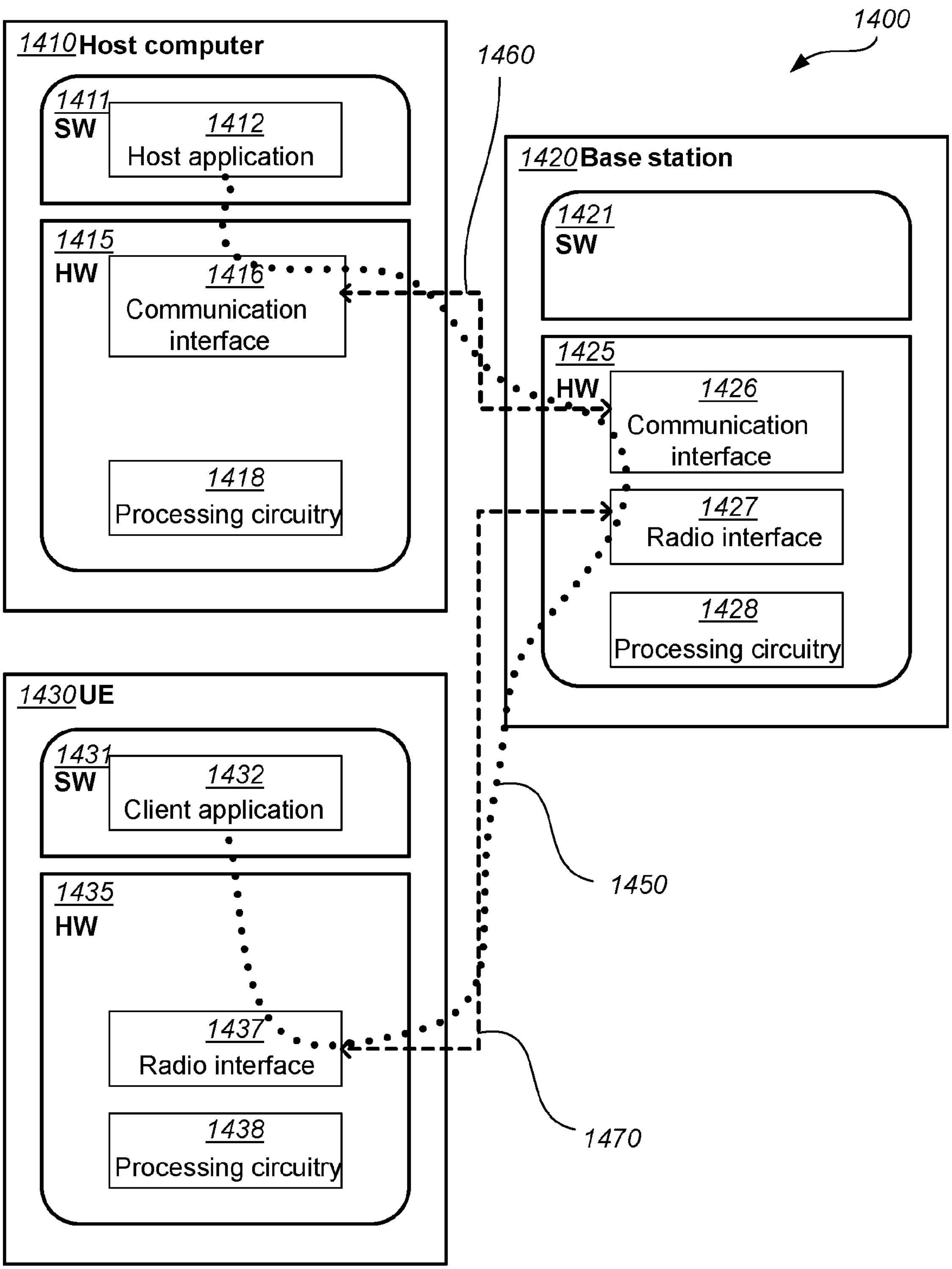
FIG. 14 is a generalized block diagram of a host computer communicating via a base station with a user equipment over a partially wireless connection.

Communication system 1400 further includes any, or both, of the first node 111 and the second node 112, exemplified in FIG. 14 as a base station 1420 provided in a telecommunication system and comprising hardware 1425 enabling it to communicate with host computer 1410 and with UF 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with the user equipment 130, exemplified in FIG. 14 as a UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UF 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
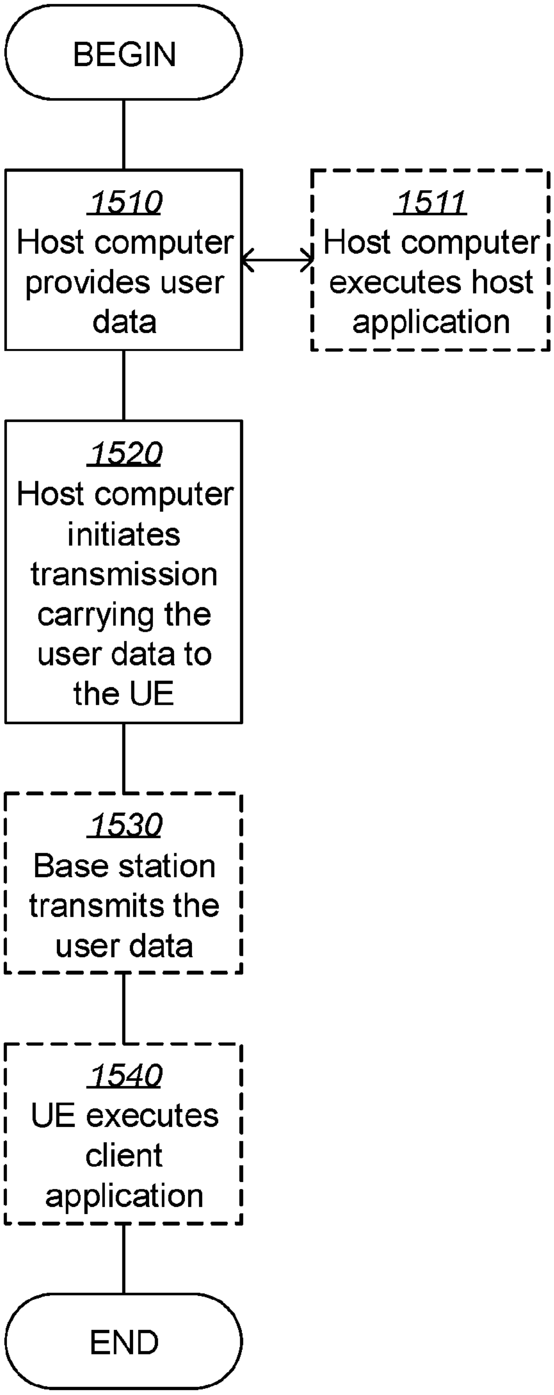
FIG. 15 is a flowchart depicting embodiments of a method in a communications system including a host computer, a base station and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
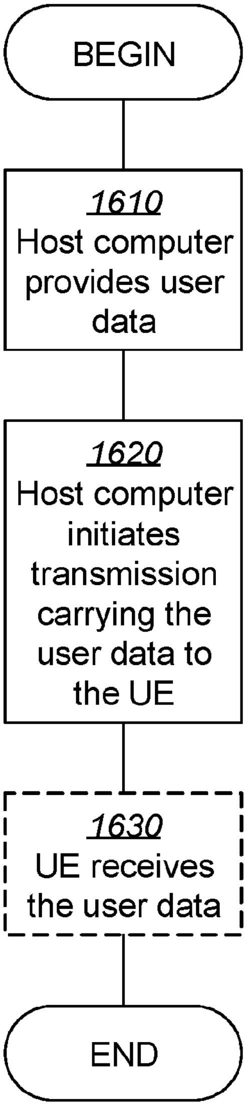
FIG. 16 is a flowchart depicting embodiments of a method in a communications system including a host computer, a base station and a user equipment.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
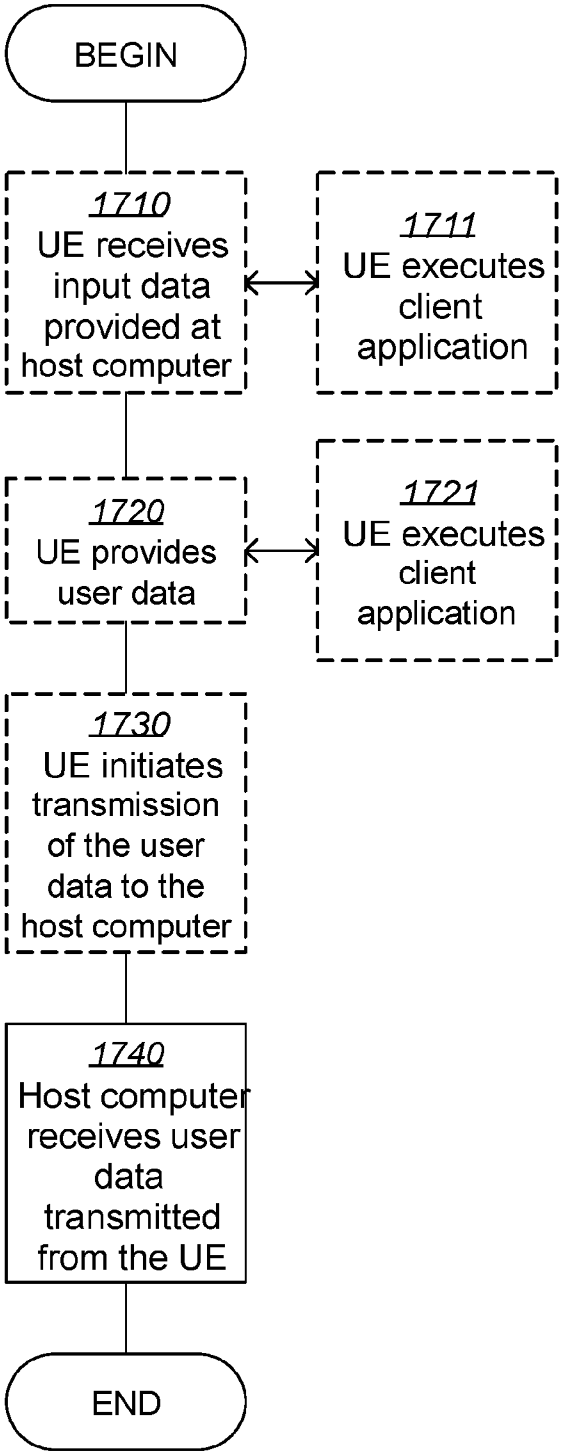
FIG. 17 is a flowchart depicting embodiments of a method in a communications system including a host computer, a base station and a user equipment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
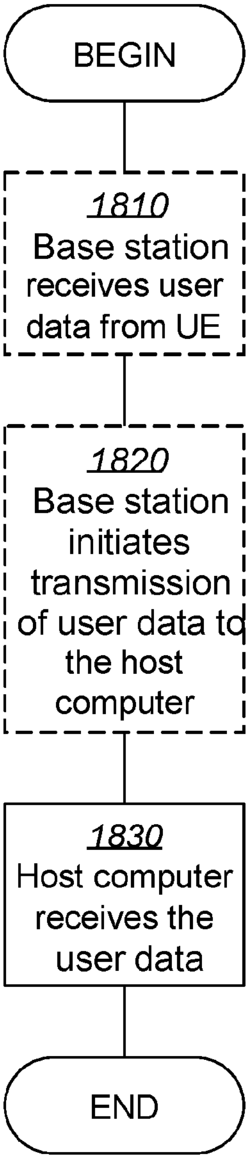
FIG. 18 is a flowchart depicting embodiments of a method in a communications system including a host computer, a base station and a user equipment.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Further embodiments are listed below:

1. A method, performed by a wireless device, UE (10), wherein the UE performs the steps of:
   - receiving data traffic at a transmission buffer, wherein the transmission buffer is being configured according to a certain time division duplex, TDD, pattern,
   - determining (S100) characteristics of the data traffic,
   - at reception of a first packet of the data traffic, determining (S102) that available uplink, UL, resources are not sufficient to transmit a second packet of the data traffic early enough to meet a certain latency requirement, and
   - sending (S103) a corresponding indication to a network node.
2. The method of Embodiment 1, wherein data traffic comprises pose information associated to an extended reality, XR, service run on an application layer if the UE.
3. The method of Embodiments 1-2, wherein determining (S102) that available uplink, UL, resources are not sufficient comprises at least one of: determining that available UL resources are not sufficient in view of a size of the second packet, and that next available UL resources are not early enough to meet the certain latency requirement.
4. The method of Embodiments 1-3, further comprising determining (S101) a predicted arrival time of the second packet.
5. The method of Embodiment 4, wherein determining (S102) that available uplink, UL, resources are not sufficient to transmit a second packet comprises determining that transmission opportunities after the arrival time of the second packet comprises one or more not activated UL configured grants.
6. The method of Embodiments 4-5, wherein sending (S103) the corresponding indication comprises at least one of: one or a plurality of UL configured grants, UL CGs, for the UE, an (expected) size of the second packet, and timing information, indicating at which time a UL configured grant is needed, e.g. a frame and a/or a slot number of the configured uplink grant to be activated.
7. The method of Embodiment 4, wherein determining (S102) that available uplink, UL, resources are not sufficient to transmit a second packet comprises determining that one or a plurality of the UL configured grants is not sufficient in size for the second packet.
8. The method of Embodiment 7, wherein sending (S103) the corresponding indication comprises at least one of: an indication that the activated UL configured grants are not sufficient to transmit the second packet, the expected packet size, a difference in size between the activated UL configured grant and the second packet size and timing information (e.g. frame/slot number) indicating at which time a UL configured grant is needed.
9. The method of Embodiments 4-8, wherein the corresponding indication comprises a list comprising a priority of the UL configured grants, and/or whether a certain UL configured grant is sufficient to transmit the second packet.
10. The method of Embodiments 1-9, wherein determining (S102) that available uplink, UL, resources are not sufficient to transmit the second packet
11. The method of Embodiments 1-10, wherein sending (S103) the corresponding indication comprises sending a Medium Access Control Element, MAC CE.
12. The method of Embodiment 11, wherein the MAC CE comprises at least one of:
    - an index or a list of indices pointing at one or a plurality of configured UL configured grants;
    - an index indicative that no UL configured grant is available but a grant is needed to transmit the second packet;
    - an index indicative that one or a plurality of unused UL configured grant are available for reuse;
    - a data size of the second packet;
    - a buffer status of the whole buffered data to be transmitted;
    - a difference between the packet size and the available UL configured grant (when the activated UL configured grants are not sufficient); and
    - timing information, e.g. frame number and/or UL slot index in which an UL resource is needed or of an UL resource that is activated but not required (to be reused).
13. The method of Embodiment 1, wherein the UE comprises an application layer and a lower layer comprising a transmission buffer controller, wherein the lower layer determines:
    - a periodicity of the traffic and/or a the packet size;
    - a (predicted) time at which a second packet arrives to the buffer;
    - a time difference to the closest UL configured grant that is potentially sufficient to transmit the second packet in a way the latency requirement is being met.
14. The method of Embodiment 13, further comprising sending an information indicative of at least the time difference to the application layer for adjustment of the timing of the generation of the second data packet.
15. The method of Embodiments 1-14, wherein sending (S103) the corresponding indication comprises sending a Medium Access Control Element, MAC CE.

16. A wireless device, UE, the UE comprising:
radio interface circuitry (11) configured to communicate with a network node via at least one cell; and
processing circuitry (12) operably coupled to the radio interface circuitry;
whereby the processing circuitry (12) and the radio interface circuitry (11) are configured to perform the steps of Embodiments 1-15.

17. A non-transitory, computer-readable medium storing computer-executable instructions that, when executed by processing circuitry of a UE, configure the UE to perform operations corresponding to any of the methods of Embodiments 1-15.

18. A computer program product comprising computer-executable instructions that, when executed by processing circuitry of a wireless device, configure the wireless device to perform operations corresponding to any of the methods of Embodiments 1-15.

19. A method, performed by a network node, wherein the network node performs the steps of:
receiving from a UE data traffic comprising a plurality of packets associated to a certain data traffic;
receiving (S300) an indication that available uplink, UL, resources at the UE are not sufficient to receive a second packet of the data traffic early enough to meet a certain latency requirement, and
transmitting (S301) control information indicative of an activation of UL resources to be used for a transmission of the second packet.

20. The method of Embodiments 19, wherein the indication comprises at least one of: one or a plurality of UL configured grants, UL CGs, for the UE, an (expected) size of the second packet, and timing information, indicating at which time a UL configured grant is needed, e.g. a frame and a/or a slot number of the configured uplink grant to be activated.

21. The method of Embodiment 19-20, wherein the indication comprises at least one of: an indication that activated UL configured grants are not sufficient to transmit the second packet, the expected packet size, a difference in size between the activated UL configured grant and the second packet size and timing information (e.g. frame/slot number) indicating at which time a UL configured grant is needed.

22. The method of Embodiment 19-21, wherein the control information is indicative of an update of one or a plurality of activated configured grant being sufficient (in size) to transmit the second packet.

23. The method of Embodiment 19-22, wherein the control information is indicative of an activation of one or more UL configured grants being sufficient to transmit the second packet to meet the ceratin latency requirement.

24. The method of Embodiment 23, wherein the information indicative of the activation is based on a set of UL configured grants indicated by the UE.

25. The method of Embodiment 19-23, wherein the control information is a physical download control channel, PDCCH message 26. A network node, comprising:
interface circuitry (21) configured to communicate with a UE;
processing circuitry (22) operably coupled to the interface circuitry;
whereby the processing circuitry and the interface circuitry being configured to perform any of the steps of Embodiments 19-25.

The invention claimed is:

1. A method, performed by a wireless device, UE (UE), wherein the UE comprises a transmission buffer and the method comprises:
determining at least a first characteristic of data traffic received at the transmission buffer;
after reception of a first packet of the data traffic and before reception of a second packet of the data traffic, determining that available uplink (UL) resources are not sufficient to meet a certain latency requirement for the data traffic; and
as a result of determining that the available UL resources are not sufficient to meet the latency requirement, sending to a network node an UL resource indication message indicating that the available UL resources are not sufficient to meet the latency requirement, wherein
the UL resource indication message is not a Scheduling Request (SR) message.

2. The method of claim 1, wherein
the data traffic comprises pose information associated to an extended reality (XR) service run on an application layer of the UE.

3. The method of claim 1, wherein
determining that the available UL resources are not sufficient comprises:
predicting a size of the second packet and determining that the available UL resources are not sufficient in view of the predicted size of the second packet, and/or
determining that a next available UL is not early enough to meet the certain latency requirement.

4. The method of claim 1, wherein
the method further comprises determining a predicted arrival time of the second packet.

5. The method of claim 4, wherein
determining that available UL resources are not sufficient to meet the latency requirement comprises determining that a transmission opportunity after the predicted arrival time of the second packet comprises a not activated UL configured grant.

6. The method of claim 4, wherein
the UL resource indication message comprises:
an UL configured grant (CG) for the UE;
an expected size of the second packet; and/or
timing information indicating a time at which an UL configured grant is needed.

7. The method of claim 4, wherein
determining that available uplink UL resources are not sufficient to meet the latency requirement comprises determining that one or more UL configured grants are not sufficient in size for the second packet.

8. The method of claim 7, wherein
the UL resource indication message comprises:
an indication that an UL configured grants is not sufficient to transmit the second packet;
a difference in size between an UL configured grant and the second packet size; and/or
timing information indicating at which time an UL configured grant is needed.

9. The method of claim 4, wherein
the UL resource indication message comprises a list comprising a priority of one or more UL configured grants, and/or whether a UL configured grant is sufficient to transmit the second packet.

10. The method of claim 1, wherein determining that available UL resources are not sufficient to transmit the second packet.

11. The method of claim 1, wherein
sending the UL resource indication message comprises sending a Medium Access Control Element (MAC CE), and
the MAC CE comprises:
an index or a list of indices pointing at one or more UL configured grants;
an index indicative that no UL configured grant is available but a grant is needed to transmit the second packet;
an index indicative that one or more unused UL configured grant are available for reuse;
a data size of the second packet;
a buffer status of the whole buffered data to be transmitted;
a difference between the packet size and an UL configured grant;
timing information, and/or
timing information by way of a frame number and/or UL slot index in which an UL resource is needed or of an UL resource that is activated but not required.

12. The method of claim 1, wherein the UE comprises an application layer and a lower layer comprising a transmission buffer controller, wherein the lower layer determines:
a periodicity of the traffic and/or a the packet size;
a time at which a second packet arrives to the buffer;
a time difference to an UL configured grant that is sufficient to transmit the second packet in a way the latency requirement is being met.

13. The method of claim 12, further comprising sending an information indicative of at least the time difference to the application layer for adjustment of the timing of the generation of the second data packet, wherein
sending the UL resource indication message comprises sending a Medium Access Control Element (MAC CE).

14. A wireless device (UE), the UE comprising:
a transmission buffer;
radio interface circuitry configured to communicate with a network node via at least one cell; and
processing circuitry operably coupled to the radio interface circuitry;
whereby the processing circuitry and the radio interface circuitry are configured to:
determine at least a first characteristic of data traffic received at the transmission buffer;
after reception of a first packet of the data traffic and before reception of a second packet of the data traffic, determine that available uplink (UL) resources are not sufficient to meet a certain latency requirement for the data traffic; and
as a result of determining that the available UL resources are not sufficient to meet the latency requirement, send to a network node an UL resource indication message indicating that the available UL resources are not sufficient to meet the latency requirement, wherein
the UL resource indication message is not a Scheduling Request (SR) message.

15. A method performed by a network node, the method comprising:
receiving from a UE data traffic comprising a plurality of packets;
receiving an indication that available uplink (UL) resources at the UE are not sufficient to meet a certain latency requirement for the data traffic, wherein the indication is not a Scheduling Request (SR), and
transmitting control information indicative of an activation of UL resources to be used for a transmission of the second packet.

16. The method of claim 15, wherein
the indication comprises:
an UL configured grant (CG) for the UE;
an expected size of the second packet; and/or
timing information indicating a time at which an UL configured grant is needed.

17. The method of claim 15, wherein
the indication comprises:
an indication that an UL configured grant is not sufficient to transmit the second packet;
a difference in size between an UL configured grant and the second packet size; and/or
timing information indicating at which time an UL configured grant is needed.

18. The method of claim 15, wherein the control information is indicative of an update of one or more of activated configured grants being sufficient to transmit the second packet.

19. The method of claim 15, wherein
the control information is indicative of an activation of one or more UL configured grants being sufficient to transmit the second packet to meet the certain latency requirement, and
the information indicative of the activation is based on a set of UL configured grants indicated by the UE.

20. The method of claim 15, wherein the control information is a physical download control channel message.

* * * * *